Sept. 16, 1941.  E. BENEDEK  2,255,962
PUMP AND MOTOR
Filed Oct. 18, 1933  3 Sheets-Sheet 1

Inventor
ELEK BENEDEK.
By Charles W. Hills
Attorney

Sept. 16, 1941.  E. BENEDEK  2,255,962
PUMP AND MOTOR
Filed Oct. 18, 1933  3 Sheets-Sheet 2

Inventor
ELEK BENEDEK
By Charles T. Hills
Attorney

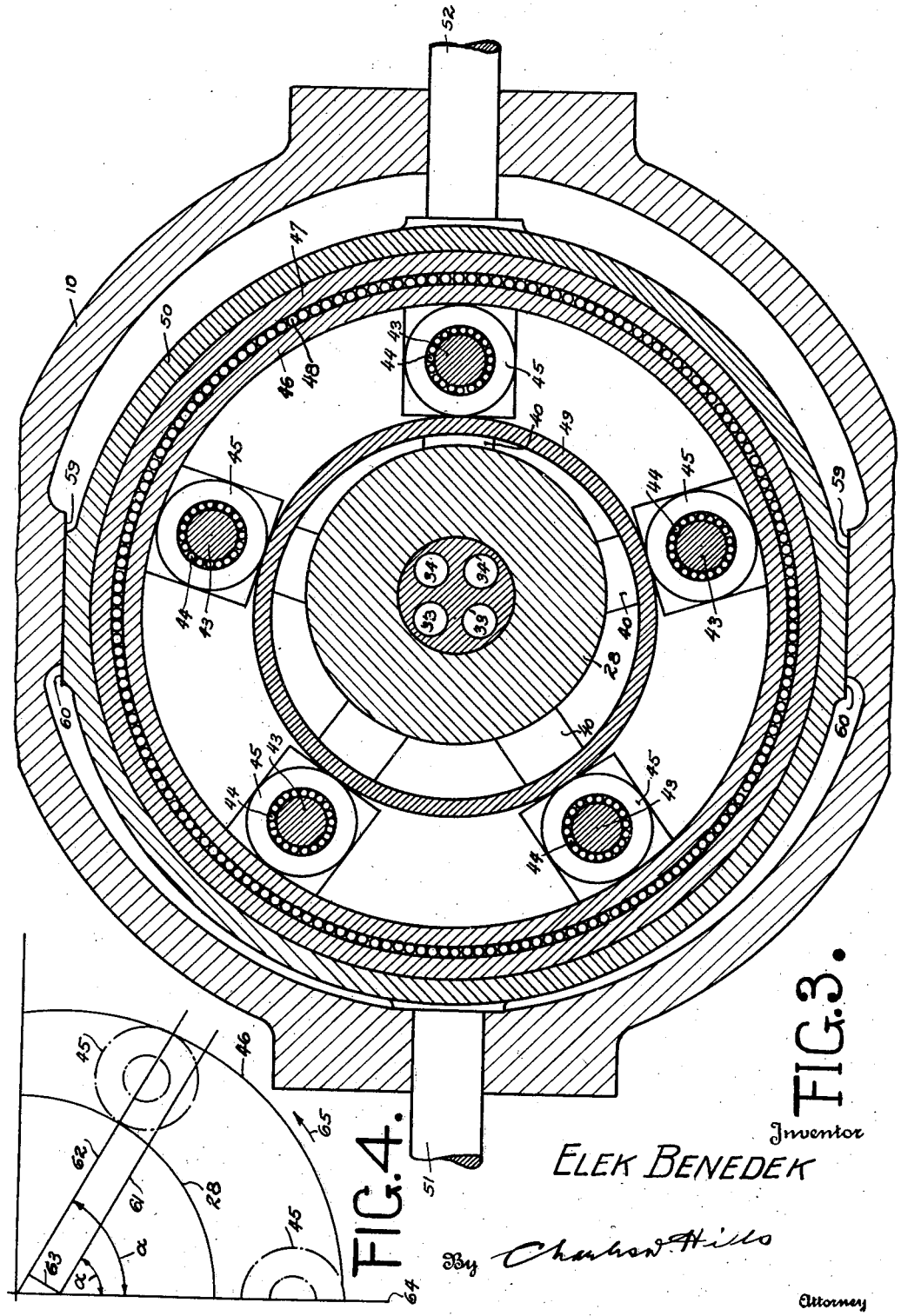

Patented Sept. 16, 1941

2,255,962

UNITED STATES PATENT OFFICE 2,255,962

PUMP AND MOTOR

Elek Benedek, Mount Gilead, Ohio

Application October 18, 1933, Serial No. 694,179

3 Claims. (Cl. 103—161)

This invention relates to high speed, high pressure, rotary pumps of the radial piston type.

Pumps of the type referred to ordinarily comprise a driven cylinder barrel rotatable about a fixed axis and carrying a radial series of pistons disposed about said axis and reciprocable radially thereto. As heretofore designed, commercial forms of pumps of the character mentioned also include a stroke-controlling drum, surrounding said driven barrel, and provided with a pair of axially spaced circular grooveways, which carries a plurality of pairs of heavy piston actuating sliding slippers, engaged by crosshead pins of the outer end of each piston, and rotatable in unison with the cylinder barrel about an axis parallel to the axis of the cylinder barrel. The stroke controlling drum having no definite engagement with said slippers, it will be driven by the frictional drag of said sliding slippers, similar to the driven member of a mechanical friction clutch. The stroke-controlling drum, being supported by adjustable bearing members, is shiftable to carry the eccentricity of said rotational axis and to thereby vary the stroke of the pistons. Such construction necessitates heavy sliding slippers to carry the high pressure piston load on the sliding cooperating circular grooveways of said stroke controlling drum on oil film, without excessive friction or seizure between the reaction surfaces of the drum and the sliding surfaces of the slippers, and also unduly long radial guiding surfaces for the pistons to take up the great reciprocating mass forces of the slippers without undue frictional wear on the pistons. The driven cylinder barrel of such construction is directly and rigidly coupled with the driveshaft, without any flexibility and torque transmitting bearing means, which would relieve said barrel from undue strains caused by the driving torque and misalignment of the shaft.

One object of the present invention is the provision of a pump of the type mentioned, so designed as to make possible the elimination of the bearing sliding slippers of the pistons above referred to, and substantially reduce the accelerating mass forces on the pistons which tend to wear out same, by substituting for them anti-friction devices which have a mass of about ten times less that of the above mentioned slippers.

Another object is the provision of a pump of the type mentioned so designed as to make possible the elimination of a heavy stroke-controlling drum, and substitute for it a pair of anti-friction inner bearing rings which have a mass of many times less that of aforesaid heavy drum, with much less inertia, and more accessible for high grade finish and assembly and disassembly without disturbing any other parts of the pump assembly.

A further object is the provision in a pump of the type mentioned of novel means for sustaining the piston reactions in such a manner as to eliminate all sliding friction between the coacting parts of the pump and dispense with a centrifugal fluid pressure reservoir, which heretofore was necessary to provide lubrication for said sliding members.

A still further object is the provision of novel means for the operation of the pistons during suction stroke, which not only will add to the efficiency of the pump, but will provide and facilitate the axial assembly and disassembly of the rollers and roller tracks.

Another object is the provision of a pump of the type mentioned, so designed that the cylinder barrel is mounted on its ends on internally mounted anti-friction bearing means and made so heavy as to incorporate the weight of a predetermined flywheel. This cylinder barrel is further provided with flexible coupling means adjacent to its driven end outside and beyond side bearing means for flexible driving connection.

Another object is the provision of a central cylindrical valve, which has more rigidity to resist the heavy resultant hydraulic piston load than the similar valve in prior constructions.

Still further object of my invention is the provision of bearing and coupling means, normally aligned and coaxial with said cylinder barrel, to take up the bearing reaction and misalignments of the driving shaft and torque respectively.

Other more specific objects and advantages will appear from the following description of an illustrative embodiment of the present invention:

In the accompanying drawings:

Fig. 3 is a transverse sectional view on line 3—3 of Fig. 1.

Fig. 4 is a diagram showing the simultaneously rotating two centerlines of the roller track and cylinder barrel respectively at the moment, when both centerlines depart from their dead center positions with an angle α of anti-clockwise rotation.

Figure 1:
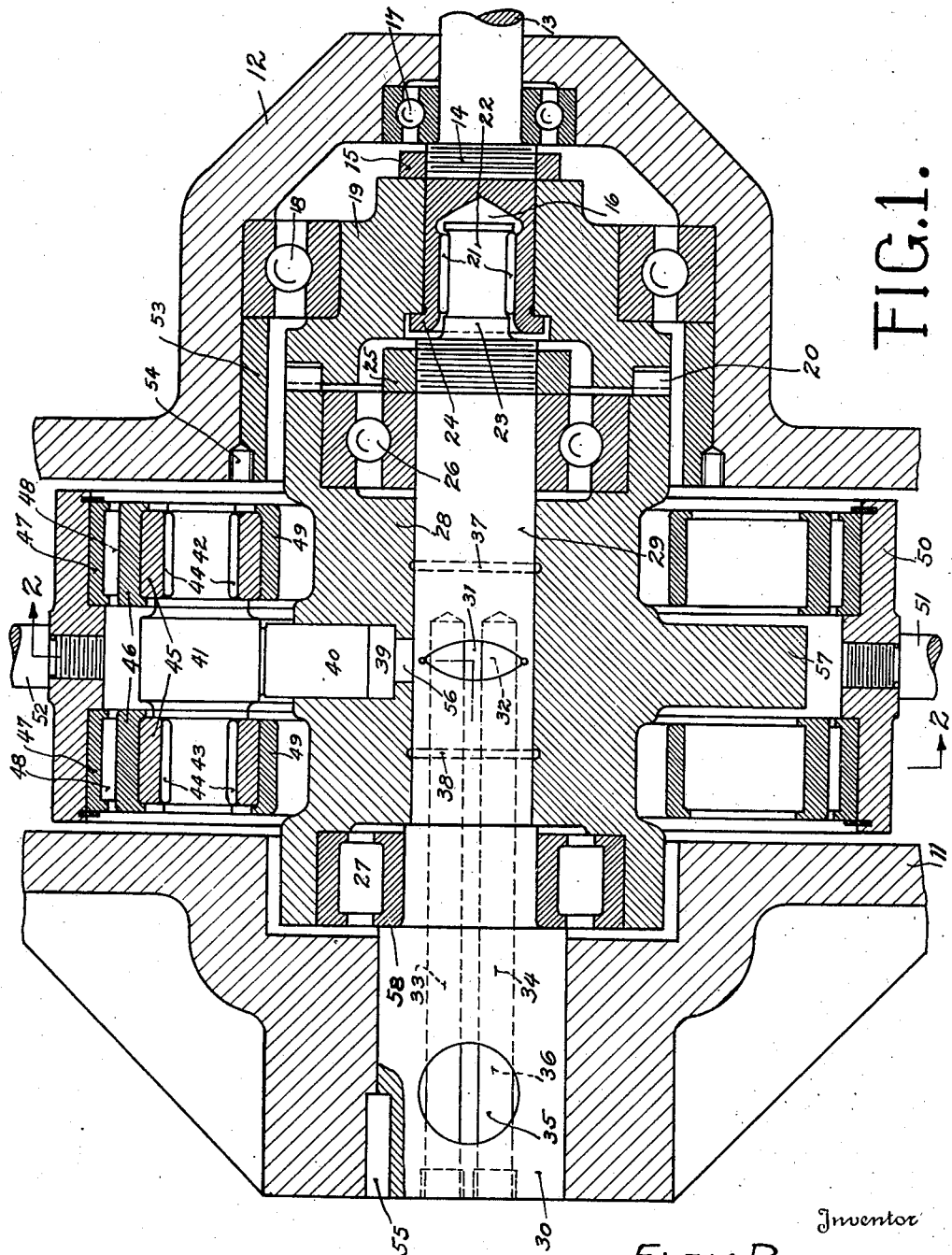
Fig. 1 is an axial sectional view of a pump constructed in accordance with the present invention.

The pump selected for illustration is enclosed within a leak-proof housing comprising a substantially cylindrical body 10 closed by valve plate 11 and drive shaft end headplate 12.

Valve end plate 11 is provided with an axially extending heavy hub, in which an enlarged portion 30 of central cylindrical valve 29 is pressed under heavy hydraulic pressure, to form for pump mains 35 and 36 a leak-proof and an air-proof hydraulic connection. The proper relative position of valve 29 during the press fit operation is assured by key 55. The main pump ports 31 and 32 are in the main meridian plane of all the pistons 40 and communicate with the piston cylinders 39 through slightly reduced radial openings as at 56. One pair of parallel axial holes 33 and 34 form communicating passages between the internal pump port 31 and external main pump port 35, and the other pair of axially parallel holes $33^1$ and $34^1$ form communication between the other set of internal and external ports 32 and 36 respectively. Each side of the internal ports 31 and 32 there is a pressure film spread limiting groove as at 37 and 38, to limit the unbalanced hydraulic pressure exerted on the side of the pressure internal pump port at a time.

Drive shaft 13, supported in appropriate anti-friction bearing 17 in end plate 12, projects into the casing and is keyed or otherwise fixed at its inner end to driving head 19. The end shoulder 24 of its inner end is rigidly secured against axial displacement by set collar 15, upon threaded portion 14 in a well known manner. Drive shaft 13 has a hollow portion as at 16 to receive a concentrically disposed and reduced portion 23 of central valve 29, projecting in said hollow portion 16, and rotatively mounted on tiny needle rollers 21 which are engaged in recess 22 of shaft end 23.

Driving head 19 is provided with an appropriate cylindrical shoulder to receive the inner race of bearing means 18, whereas the outer race of bearing means fits in corresponding internal groove provided in end plate 12. The bearing 18 is locked in position by sleeve 53 and set screws 54.

Driving head 19 is provided with a plurality of coupling elements as at 20, to engage similar coupling elements of the driven cylinder barrel 28. In this manner, there is provision for sufficient flexibility between barrel and driving means to assure free rotation of the barrel on its supporting bearing means 26 and 27.

Cylinder barrel 28 comprises a substantially cylindrical body incorporating sufficient weight to exert a predetermined flywheel effect and thereby to assume smooth and vibrationless operation of the pump. This barrel 28 is provided with concentric counterbores at both ends to receive anti-friction bearing means 26 and 27. In addition to the central cylindrical portion, barrel 28 has a circular flange portion as at 57 to provide adequate guide surfaces for the enlarged outer ends of the radial pistons as at 66.

Each enlarged outer end of the pistons is provided with a pair of lateral journals or crosspins 42 and 43 which carry rollers 45, mounted on needle roller bearings 44. Each of the crosshead rollers 45 is supported in both radially in and out direction by appropriate independent annular reactance members or floating rings 46 and 49 respectively, 46 of which is the external reactance member which also forms the internal race of a complete set of anti-friction bearings 48. An adjustable eccentric reactance housing 50 rotatably supports the reactance members 46 through the medium of the bearings 48 and outer races 47. Eccentric reactance housing is attached to control rods 51 and 52 which lead to control apparatus, not shown in the drawings and which will operate the stroke-controlling bearing housing 50 to change the stroke and the delivery of the pump.

Pintle or central valve 29 being supported now in its ends its deflection under resultant hydraulic piston load will be only a fractional part of the deflection inherent in pumps of prior design utilizing the cantilever type of pintle.

The pintle cutouts 31 have a shape of continuously increasing or decreasing passage area for the influx or efflux of the fluid to and from the cylinders and which area is strictly proportional to the momentary displacement of the individual pistons. Limiting oil grooves 37 and 38 are provided in the coacting surfaces of the barrel 28 or pintle 29, respectively, in order to limit the film spread of the motive fluid axially on the pressure side of the pintle 29 and furthermore to carry the pressure fluid around the pintle in the grooves to the suction side thereof and thus to provide counterbalance action and lubrication for the suction side of the coacting surfaces. The counterbalance action will be exerted by the axial film spread or extension which will occupy a certain length of zone at both sides of both grooves 37 and 38. Therefore it will be seen that, due to the axial extension of the pressure or film at both sides of the limiting grooves, not only the total axial spread of the film will be limited but a certain amount of hydrostatic load created by the film spread will be balanced. The partial balance of the hydrostatic load between the pintle and cylinder barrel will naturally reduce the radial load of bearings 26 and 27. A perfect balance of the pintle 29 is impossible due to the operating clearance between the pintle and cylinder barrel which always requires a certain amount of hydro-dynamical unbalance even if there is a substantial hydrostatic balance. For this reason it is of primary importance to provide pilot needle bearings 21 in the counterbored enlarged end 24 of shaft 13 which is located substantially in the plane of the driving head bearing 18 and thereby the deflection of the pintle end stub 23 will be indirectly placed and taken up by the heavy bearing 18.

In order to reduce the reciprocating mass forces or inertia of the cross head devices, I reduce not only the masses of said devices but also their weight by making the rollers 45 from light and wear resistant material, such as duraluminum.

In order to compensate for the decrease of momentum of the entire pump assembly caused by the reduction of wheel masses 45, I make the cylinder barrel extra heavy, to exert a positive amount of rotary momentum required and predetermined by the speed and size of the pump, to give a predetermined degree of evenness or smoothness to its running.

The extra heavy and substantially cylindrical barrel 28 thus will permit mounting the bearings 26 and 27 directly between pintle and barrel thus to assure and maintain an accurate concentricity and a permanent oil film in the concentric clearance space between them through this type of mounting.

It is further noticeable that owing to the provision of the flexible connection as at 20, in the form of a pair of normally aligned teeth or jaw coupling, there is no unbalanced or side load applied on the cylinder barrel as it is the case when the pump drive is not coaxial with the axis of the pintle, but it is parallel and eccentric thereto. Hence, the great significance of the pilot support of the outer end 23 of pintle 29 because it facilitates the balanced drive of the cylinder barrel and centered mounting thereof directly on the pintle.

Since the mechanical mass of needle rollers 44 is very small and practically negligible as to building up inertia forces, and furthermore since the mass of wheels 45 is a fractional part only of masses of prior constructions in pumps of the type referred to, it is obvious that in my design the inertia mass of needles 44 and rollers 45 may be less than the inertia of the pin of old designs, in view of the fact that I make my wheels 45 from light weight metal such as duraluminum, which can be hardened. Consequently, it is possible in my new pump that the total inertia of the wheels is negligible compared to the inertia of the large sliding shoes and slippers of old designs, wherein the friction drag is another big factor which adds to the inertia, whereas in my anti-friction devices such friction drag is entirely eliminated.

It must be remarked that one incident importance of the pilot supporting of pintle 29 is in the fact that by set collar 25 bearings 26 and 27 may be pre-loaded or adjusted and thus the cylinder barrel will have a definite set axially irrespective of the pressure; since pintle 29 and pintle bore have a slight taper fit, which fit exerts an axial force component especially under high pressure. By the expression "definite set," above mentioned, it is intended to define that by a certain axial adjustment of the inner race of the bearing 26 by means of the set collar 25, the latter is adapted to act against the bearing 27 and the pintle shoulder 58, and thus the axial load component of the pressure fluid on the cylinder barrel and against the tapered pintle will not have any effect to slightly shift the barrel off the pintle. Therefore, due to the capability of pre-loading or pre-adjusting the bearing 26, the cylinder barrel will maintain a predetermined radial clearance with reference to the pintle which would not otherwise be obtainable, especially where the action of the pressure fluid is such as to shift the cylinder barrel in the opposite direction. In all of the older designs a positive setting of the cylinder barrel is impossible, since the bearing which would correspond to 26 is mounted ordinarily in end cover 12, hence an accuracy in the axial position of the cylinder barrel is impossible, since the body portion of the pump usually expands and loosens the bearing mounted in the end cover.

Referring more specifically to the bearings 26 and 27, the bearing 27 has an inner race press fitted onto the pintle. It will be seen that the heavy pintle portion at the zone of the bearings 27, which is immediately adjacent the portion of the pintle supported in the casing, that little deflection can occur and with the barrel and pintle carefully formed for concentricity this concentricity will be maintained, the clearance on such bearing being less considerably than the clearance space between the pintle and barrel. Due to the great rigidity of the pintle at this portion, this centering of the pintle and barrel will be maintained. At the opposite end of the pintle, however, the maximum deflection occurs and it is because of this deflection that trouble is apt to arise. The bearing 27 is actually a pivotal point with respect to the barrel and pintle about which relative swinging of the two with respect to each other occurs, due to deflection of the pintle under load, machining inaccuracies of the pintle and barrel, assembly inaccuracies or warpage. The result of such relative pivoting about the bearings 27, however, magnifies the deflection and misalignment at the opposite end of the pintle. The opposite end, therefore, is the danger point where the deflection is the maximum and at this point, accurate adjustment between the pintle and barrel must be maintained, not only to resist deflection but also to compensate for wear. Therefore, while the bearing 27 need not necessarily be adjustable as to the bearings 26, which receive the greatest stress and must correct misalignment, prevent deflection and the like, adjustment is necessary for maintaining the proper relationship. The bearing 27 is relatively fixed with respect to the pintle and the cylinder barrel, but necessarily is preloaded axially when the bearing 26 is preloaded by tightening of the nut 25. Thus the bearing 27 acts as an abutment for holding the cylinder barrel against axial movement so that the ball bearing 26 may be preloaded both axially and radially.

To accommodate such axial adjustment, pre-loading or setting of barrel 29, race tracks 46 are made so that they yield axially to such extent as necessitated by the adjustment of nut 25, thus the assembly will be free and unstrained, even if cylinder barrel 28 is axially adjusted and set against shoulder 58 of pintle head 30.

The suction stroke of all pistons is controlled by internal annular reactance members or floating rings 49. Their significance is now obvious when we consider wheels 45 pushed with tremendous force, exerted by crosshead pins 42 and 43, against the external reactance members 46, rotating with the speed of driveshaft 13, have to carry out swinging motion only and not complete revolutions. Therefore, in order to make this swinging motion possible the floating rings or internal reactance members 49 swings back and forth with the wheels so as to eliminate sliding of the wheels and the sliding friction inherent in pumps of prior design.

It is the purpose of Fig. 4 to give a geometrical and mathematical diagram as to the amount of relative oscillation of the centerline of wheels 45 on the inner race of roller bearing 48. As was mentioned previously members 46 assume a synchronous rotation with drive shaft 13, whereas the rollers 45, when the pump is in the eccentric position as shown in Fig. 3, will have incomplete rotary motion only, the amount of which is determined by the eccentricity of the axis of barrel 28 and the axis of reactance housing 50.

In Fig. 4, axis 64 designates the dead center position of all the pistons, so that wheel 45 when on axis 64, carries the piston in its neutral position. In this neutral position which coincides with the center line of rods 51 and 52 in Fig. 1 the momentary centerlines 61 and 62 of the barrel 28 and of the races 46 will also coincide. But after a rotation with an angle of $\alpha$, centerlines 61 and 62 will be separated at a distance marked 63. Since the rotation is at high speed and the time element is too short to effect such relative shift of wheel 45 on member 46 the acceleration force required to effect this shift may become enormous. According to my analysis, the absolute value of such acceleration is directly proportional to the square of the angular velocity of the pump and is in linear proportion to the mass of the wheels. Since in high speed pumps the speed must be maintained as a commercial requirement, in order to reduce tangential acceleration forces on the pistons it is necessary to reduce the masses of the rollers 45, which has been done.

Figure 2:
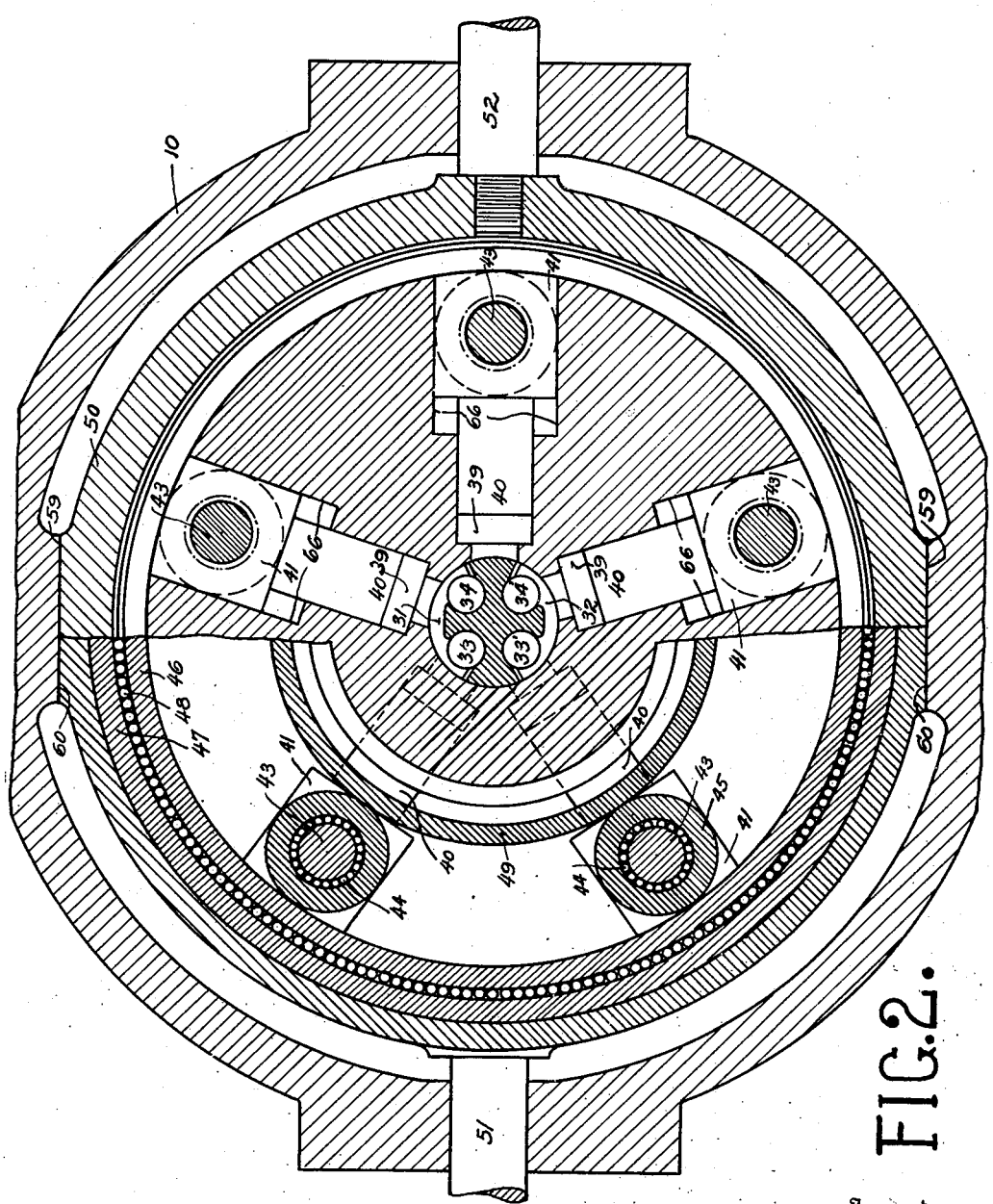
Fig. 2 is a transverse sectional view on the line 2—2 of Fig. 1.

The pump will operate in a well-known manner. When stroke controlling housing 50 is in concentric relation with cylinder barrel 29 as it is shown in Figs. 1 and 2, the pistons will be operated between concentric floating rings 46 and 49 which are further concentric with the axis of the cylinder barrel 28 as well as of pintle 29, therefore there will be no pumping action in the cylinders 39.

However, when the stroke controlling or reactance housing 50 and the cooperating members 46 and 49 will be shifted into eccentric position on cooperative pads 59 and 60, as shown in Fig. 3, the pistons 40 assume relative reciprocation in their associated cylinders 39 to the amount of twice the momentary eccentricity of the shift. By shifting the housing 50 into the opposite direction the pump will reverse its discharge in a well known manner. It will thus be noted that I have provided a pump of simple and economical design, in which, besides the hydraulic instrumentalities such as pistons, cylinders and valve, there is no frictional element involved to create heat under the heavy load, therefore the working temperature of my pump will be lower than that of pumps previously referred to and will withstand heavy duty service for long periods of time without excessive wear and seizure.

Various changes may be made in the embodiment of the present invention hereinabove specifically described without departing from the invention as defined in the appended claims.

I claim:

1. In a rotary radial piston pump or motor of the character described having a valve pintle supported at one end, a piston carrying barrel rotatably mounted on the pintle and in valving cooperation therewith, and said pintle having a free end portion protruding beyond the barrel at the end opposite the pintle support, a driving head separate from the barrel, means independent of the pintle and barrel for rotatably supporting the head and for constraining the head from radial and axial loading of the barrel by the driving head, said driving head having an axial bore coaxial with the pintle and opening theretoward and receiving the said protruding end of the pintle, pilot bearing means for supporting the protruding pintle end in said bore for relative rotation with respect to the head and for resisting deflection of the pintle, means flexibly connecting the driving head and barrel, and impeller means carried by said driving head.

2. In a rotary radial piston pump or motor of the character described having a casing, a rotatable piston carrying barrel therein, a tapered valve pintle fixedly mounted at one end in the casing and in valving relation in the barrel, and antifriction bearing means between each end of the barrel and the pintle rotatably supporting the barrel on and in valving relation to the pintle, a rotatable driving head coaxial with the barrel adjacent the opposite end of the pintle, an impeller shaft operatively connected to said head, means disassociated from the pintle, the shaft, and the barrel for rotatably mounting said head on the casing and maintaining said head in fixed position axially and radially relative to the pintle, clutch means connecting the barrel and head for rotation together and for maintaining said connection while permitting limited relative radial and axial movement of the head and barrel, whereby the barrel is relieved from radial and axial loading by the head while the driving relation between the head and barrel is maintained.

3. In a rotary radial piston pump or motor of the character described, a casing, a valve pintle fixedly secured by one of its ends in the casing, a piston carrying barrel coaxial with the pintle, reactance means, piston and cylinder assemblies operatively interposed between the barrel and reactance means, sets of anti-friction bearings mounting the pintle and respective end portions of the barrel for rotatably supporting the barrel on the pintle and for constraining the barrel and pintle to accurate coaxial relation with respect to each other, a self-contained driving head separate from and coaxial with the barrel and pintle, an impeller shaft operatively connected to said head, anti-friction bearings mounting the head in the casing independently of said shaft, means flexibly drivingly connecting the head and barrel for rotation together, and means including said driving head operatively supporting the said other end of the pintle by the casing while permitting free axial elongation and contraction of the pintle relative to the casing, whereby both free axial elongation and contraction of the barrel and pintle together relative to the casing and a dual support for the pintle in the casing is provided.

ELEK BENEDEK.